W. A. EDWARDS.
DINNER PAIL.
APPLICATION FILED NOV. 23, 1908.
941,915.
Patented Nov. 30, 1909
2 SHEETS—SHEET 2.
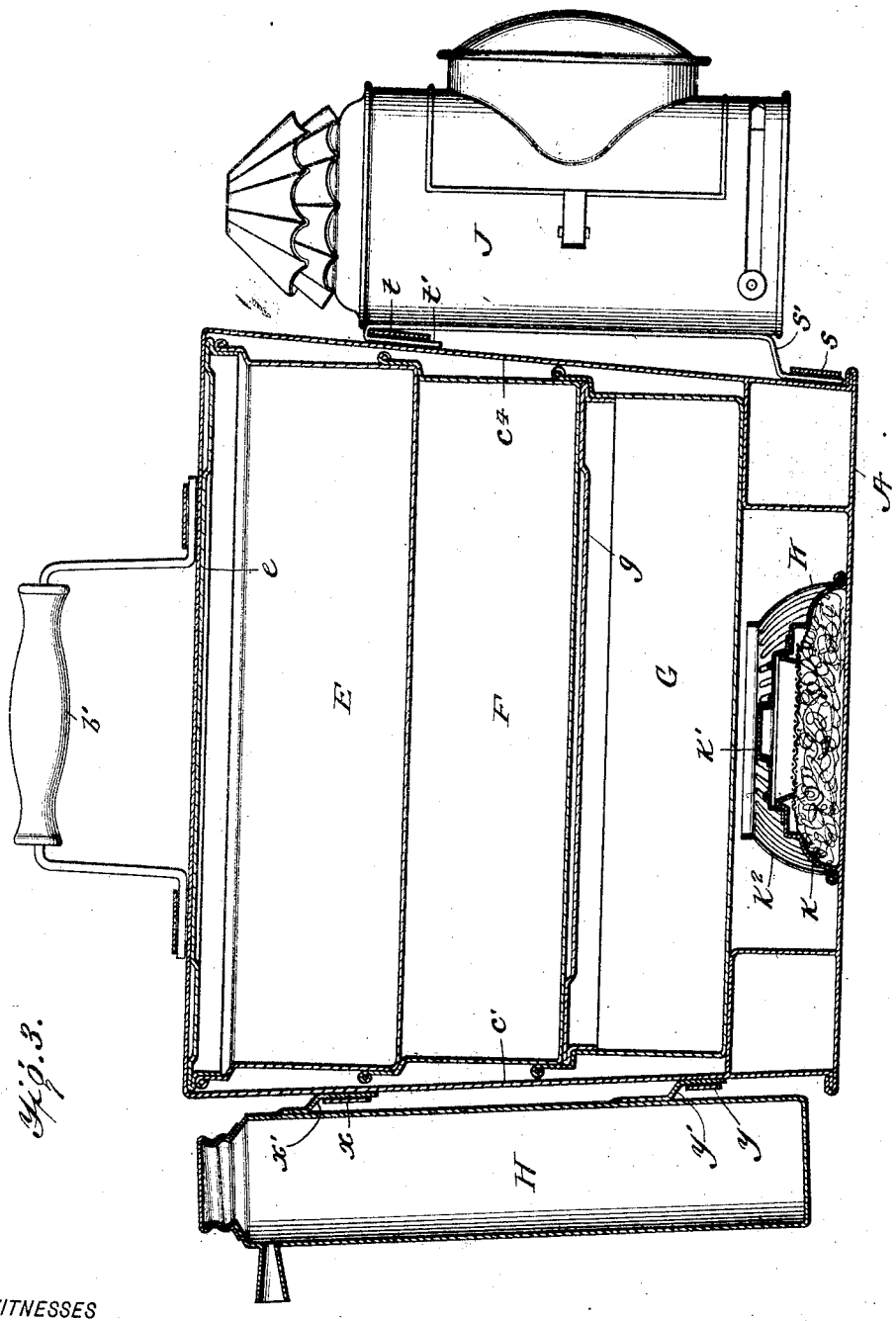
WITNESSES
L. H. Schmidt
L. A. Stanley
INVENTOR
WILLIAM A. EDWARDS,
BY Munn & Co.
ATTORNEYS

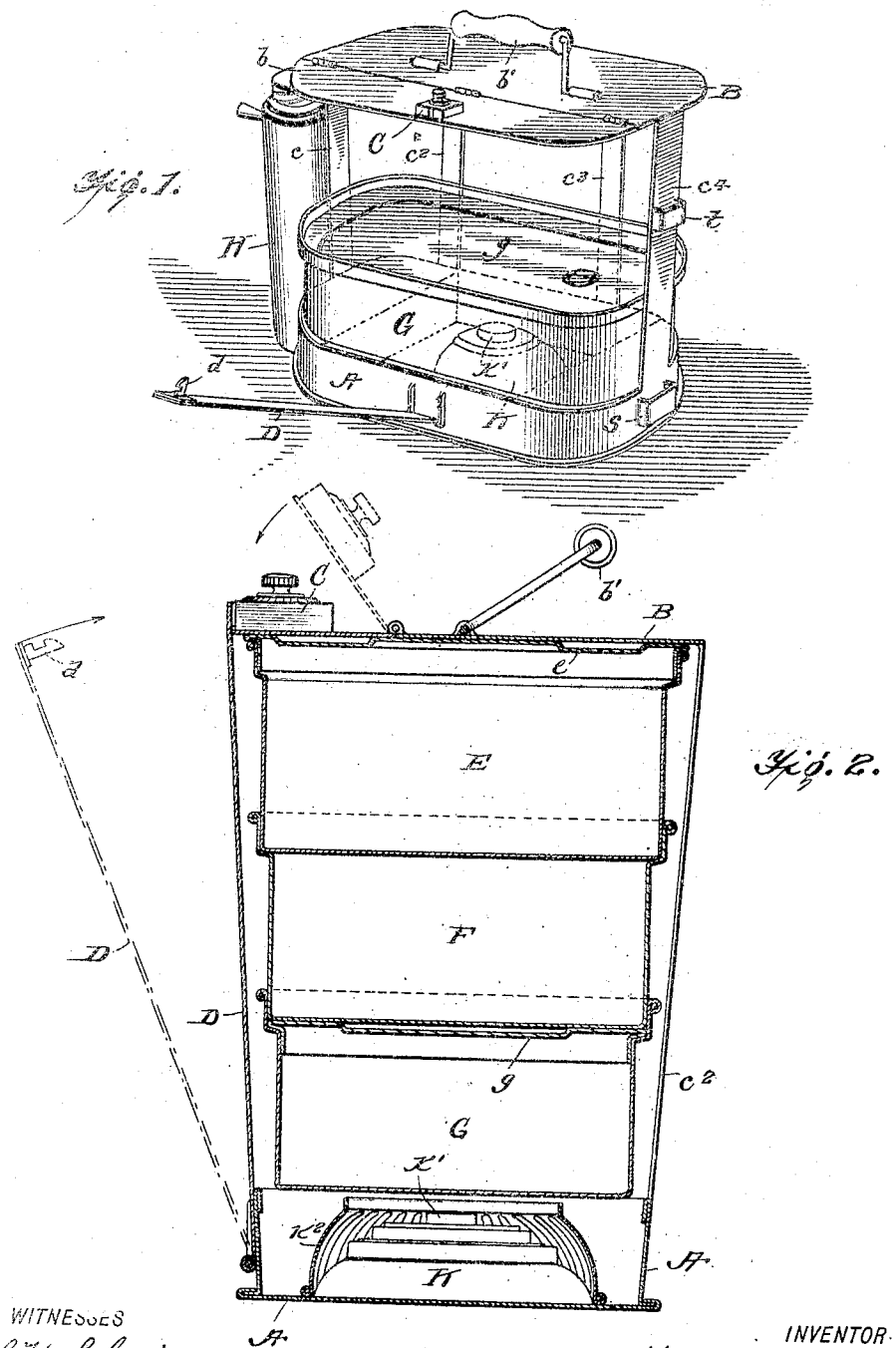

UNITED STATES PATENT OFFICE.

WILLIAM ABRAHAM EDWARDS, OF PINE BLUFF, ARKANSAS.

DINNER-PAIL.

941,915. Specification of Letters Patent. Patented Nov. 30, 1909.

Application filed November 23, 1908. Serial No. 463,975.

*To all whom it may concern:*

Be it known that I, WILLIAM ABRAHAM EDWARDS, a citizen of the United States, and a resident of Pine Bluff, in the county of Jefferson and State of Arkansas, have made certain new and useful Improvements in Dinner-Pails, of which the following is a specification.

My invention relates to improvements in dinner pails and it consists in the combinations, constructions and arrangements herein described and claimed.

An object of my invention is to provide a device in which articles such as soup and coffee can be heated with very little trouble and in which the remainder of the victuals can be warmed without any danger of burning.

A further object of my invention is to provide a means of carrying the liquid fuel for the heating means.

A further object is to provide a means for locking the dinner pail to prevent its contents from being stolen.

Other objects and advantages will appear in the following specification and will be particularly pointed out in the appended claims.

My invention is illustrated in the accompanying drawings in which—

Figure 1 is a perspective view of my device with the upper compartments removed; Fig. 2 is a central vertical transverse section through the device, and Fig. 3 is a longitudinal section.

In carrying out my invention I provide a base A, and a top B joined together by four upright members $c'$, $c^2$, $c^3$ and $c^4$, two of these members being on one side and the other two being at the respective ends. The top B has a hinged lid $b$ and a handle $b'$. Upon the lid $b$ is a lock C, which is preferably a combination lock and is designed to engage a latch member $d$ on a bar D which is pivoted to the base A. The bar may be let down to permit access to a number of nested pans or buckets E, F and G. The lower pan G is supported on the top of the base A and is provided with a cover $g$. The upper pan E is also provided with a cover $e$. The upright member $c'$ at one end of the device is provided with the upper and lower eyes $x$ and $y$ through which the tongues $x'$ and $y'$ attached to the reservoir H are adapted to pass to secure the reservoir to the device. The upright member $c^4$ at the other end has similar eyes $t$ and $s$ to receive the tongues $t'$ and $s'$ attached to the lantern J. The base contains a spirit lamp K, having the usual body portion $k$, cap $k'$ and distributer $k^2$.

The use of my improved device will be readily understood from the foregoing description of the various parts.

The pans are first filled with victuals, the lower pan G preferably containing the liquid such as coffee or tea. The pans are assembled as shown in Fig. 2, being placed between the uprights $c'$, $c^2$, $c^3$ and $c^4$ from the side opposite $c^2$ and $c^3$ while the member D is down. The latter member is then raised and the lock C holds it in position. When it is desired to heat the lunch, the pans are removed and a spoonful of wood alcohol from the reservoir H is poured on the lamp K and ignited. The pans are then replaced. The liquid in the lower pail G is thoroughly heated while the food in the other pail is warmed.

If the pail is to be used at night the lantern J may be easily attached and carried with the former.

I claim:

1. In a dinner pail, a base, a top, a pair of uprights connecting one side of said base and top, a separate upright connecting each end of the base with the top, a hinged lid secured to said top, a locking member pivotally secured to said base on the opposite side from the first named uprights and means for securing said locking member to said hinged lid.

2. In a dinner pail, a base portion, a lamp disposed in said base portion, a plurality of nested pans supported on said base above said lamp, a top, a pair of uprights connecting one side of said base and top, a separate upright connecting each end of the base with the top, a hinged lid secured to said top, a centrally disposed locking member pivotally secured to said base on the opposite side from the first named uprights and a lock carried by said hinged lid and adapted to engage said locking member to secure the latter in position.

WILLIAM ABRAHAM EDWARDS.

Witnesses:
 FRANK JACKSON,
 G. BILLINGSLEY.